United States Patent
Ohrem et al.

(10) Patent No.: US 6,767,665 B1
(45) Date of Patent: Jul. 27, 2004

(54) METHOD FOR PRODUCING MOLTEN SALTS WITH AN EXTRUDER AND USE OF THE MOLTEN SALTS

(75) Inventors: Hans-Leonhard Ohrem, Jugenheim (DE); Susanne Brzezinski, Einhausen (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/857,602

(22) PCT Filed: Dec. 3, 1999

(86) PCT No.: PCT/EP99/09485

§ 371 (c)(1),
(2), (4) Date: Jun. 8, 2001

(87) PCT Pub. No.: WO00/35809

PCT Pub. Date: Jun. 22, 2000

(30) Foreign Application Priority Data

Dec. 15, 1998 (DE) .......................................... 198 57 788

(51) Int. Cl.$^7$ .............................. C01B 9/00; C09K 5/00; C01F 7/00

(52) U.S. Cl. .......................... 429/103; 429/17; 429/49; 165/10; 165/901; 165/902; 165/104.11; 165/104.19; 423/463; 423/464; 423/465; 423/DIG. 12; 205/230

(58) Field of Search ................................ 423/463, 464, 423/465, DIG. 12; 429/17, 49, 103; 165/10, 901, 902, 104.11, 104.19; 205/230

(56) References Cited

U.S. PATENT DOCUMENTS

| | | | |
|---|---|---|---|
| 3,128,151 A | * | 4/1964 | Zanon et al. ................ 423/465 |
| 3,514,253 A | * | 5/1970 | Robota ........................ 423/465 |
| 3,650,730 A | | 3/1972 | Derham |
| 3,761,578 A | | 9/1973 | Anderson |
| 4,141,960 A | * | 2/1979 | Long et al. .................. 423/417 |
| 4,428,920 A | * | 1/1984 | Willenberg et al. ......... 423/465 |
| 4,846,943 A | | 7/1989 | Coetzer |
| 5,242,669 A | * | 9/1993 | Flor ............................ 423/465 |
| 6,221,129 B1 | * | 4/2001 | Belt et al. ...................... 75/746 |

FOREIGN PATENT DOCUMENTS

| | | |
|---|---|---|
| FR | 2168912 | 9/1973 |
| GB | 2056757 | 3/1981 |

OTHER PUBLICATIONS

Chemical Abstracts vol. 94 No. 22, Jun. 1, 1981 abstract No. 177988 Moszynski Jr. et al "Development of intermediate temperature thermal storage systems".

Zusammenfassung & Report, DOE/CS/35760–T1, 63 pp: NTIS from Energy Res. Abstr (No. 33641) 1980, No month.

H.L. Friedman et al "Observations on the chlorogallates and related compounds" Journal of the American Chemical Society, Bd. 72, 1950–22236–22243, No month.

* cited by examiner

Primary Examiner—Ngoc-Yen Nguyen
(74) Attorney, Agent, or Firm—Millen, White, Zelano & Branigan, P.C.

(57) ABSTRACT

The invention relates to a method for producing molten salts and their mixings, using an extruder. The starting materials are melted and reacted and the products of the reaction are then guided via a column with alkali salt.

20 Claims, 1 Drawing Sheet

METHOD FOR PRODUCING MOLTEN SALTS WITH AN EXTRUDER AND USE OF THE MOLTEN SALTS

Figure 1:
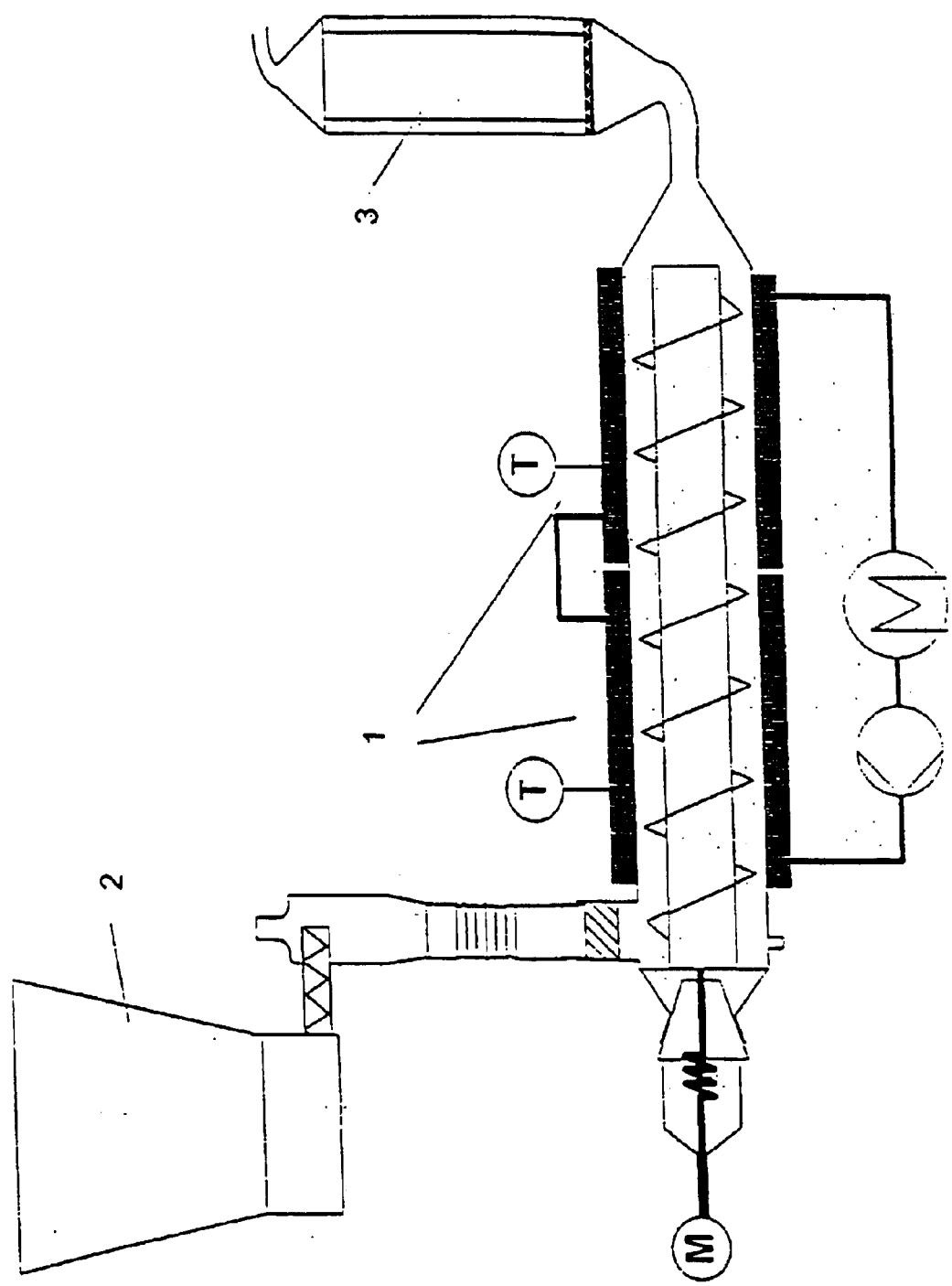

The invention relates to a process for the preparation of salt melts and mixtures thereof by means of an extruder in which the starting materials are melted and brought to reaction, and the reaction products are subsequently passed through a tower or column containing alkali metal salt.

Extruders are traditionally employed for melting and mixing polymeric materials, such as plastics. The extruders can also be used as reactors for polymerizations. Anionic polymerization in an extruder is described, for example, for caprolactam to nylon 6 (B. Vanuskirk, M. K. Akkapeddi, Polym. Prepr. Vol. 29, 557 (1988)). The advantage of using an extruder rather than a stirred-tank reactor for polymerization reactions is that it is easier to process high-viscosity substances. The requirement for thorough mixing of all substances participating in the reaction and good heat transfer can also be achieved optimally by using an extruder (G. Menges et al., New Polym. Mater., Proc. Int. Semin., 129–148 (1987)). In EP 813 904, pharmaceutical active ingredients are prepared by means of extruders. Here, pharmaceutical active ingredients carrying acid groups are reacted with a base in the melt.

Melts of salts, such as, for example, $NaAlCl_4$, have various areas of application. Salt melts can be employed as storage medium in heat stores, as heat-transfer agents, for example in heating baths, for covering and purifying molten metals, for electro-coating of high-melting materials or as melt electro-lyte in primary batteries, as described in GB 2,046,506. A further possible application of these salts is in re-chargeable sodium batteries. The salts are employed in batteries which have operating temperatures of between 130° C. and 200° C. (K. M. Abraham, D. M. Pasquariello, J. Electrochem. Soc., Vol. 137. 1189–1190 (1990)).

DE 3419279 describes an electrochemical cell in which the cathode matrix is impregnated with a sodium/aluminium halide salt melt electrolyte.

A relatively new area of application is the "ZEBRA battery". This high-temperature cell consists of an electrode of liquid sodium, a beta-aluminium electrolyte and an electrode of transition-metal chloride in an $NaAlCl_4$ melt (B. Cleaver, V.S. Sharivker, J. Electrochem. Soc., Vol. 142, 3409–3413 (1995)).

DE 3718920 describes the preparation of salt melts by adding a pure metal and an alkali metal halide to the melt. The reaction cell is operated above the melting point of the salt melt. In the working example, the alkali metal halide is NaCl, the molten alkali metal is sodium, and the separator is beta-aluminium oxide. Owing to the use of pure sodium, special safety precautions, such as working under a protective-gas atmosphere, must be taken. The reactions must take place in separate cells, since poisoning of the separator by the by-product $AlHal_3$ formed must be prevented.

For the preparation of the alkali metal halogen aluminates, the reaction of corresponding aluminium halides and alkali metal halides in a sealed tube is described (Friedmann, Taube, J. Am. Chem. Soc., 72, 2236–2243 (1950)). In this process, an increase in pressure to 6–7 atmospheres is observed, which results in problems (FR 2168912). The apparatuses must be fitted with the appropriate safety precautions.

All the processes disclosed hitherto for the preparation of salt melts operate batchwise. A batch procedure has some severe disadvantages compared with a continuous preparation process. During a batch change, the apparatus must be opened. The product can then be contaminated by the oxygen from the ambient air, water and dust. The batch change results in downtime of the plants and thus in a reduced space-time yield. An effective discontinuous process requires large apparatuses. The start-up process requires correspondingly more energy and time. It has been found that, in particular during start-up of the plants, impurities can be introduced into the process. FR 2168912 describes a complex purification process for alkali metal halogen aluminates. The 2-step purification process consists of oxygen treatment for degrading the organic impurities and aluminium treatment for precipitating iron and heavy metals. The aluminium treatment must be carried out under a nitrogen or argon atmosphere.

The object of the invention is to provide a continuous process for the preparation of pure salt melts which excludes the disadvantageous effects of the environment, minimizes the energy requirement and facilitates an optimum space-time yield. A further object is to make large amounts of salt melts available in the shortest possible time.

The object according to the invention is achieved by a process for the preparation of salt melts, and mixtures thereof, of the general formula $$MDHal \qquad (I)$$

in which
  M is Li, Na, K, Rb or Cs,
  D is Al, Ga, In or Tl, and
  Hal is F, Cl, Br or I,
characterized in that the starting materials, a metal halide and an alkali metal halide, are melted and brought to reaction continuously or, if desired, discontinuously in a heatable extruder with forced conveying, and the reaction products are subsequently passed through a tower or column containing alkali metal salt.

The process products are suitable for use as melt electrolyte in electrochemical cells, as storage medium in heat stores, as heat-transfer agent, for example in heating baths, for covering and purifying molten metals, for electrocoating of high-melting materials or as melt electrolyte in rechargeable sodium batteries and primary batteries.

Surprisingly, it has been found that the starting materials can be processed by means of an extruder. It is possible to prevent the feared contamination of the product by abrasion by means of a suitable choice of material and residence time.

It has been found that forced conveying in the extruder by pumps can be omitted in this process, which considerably reduces the susceptibility of the process to faults.

Any extruder which appears suitable to the person skilled in the art can be used for the process. Particularly suitable extruders are single-screw extruders, multiscrew extruders with co-rotating and counterrotating screws, vented extruders, planetary-gear extruders, ram extruders and disc extruders. For the processing of salts in extruders, the hardness of the substances employed and their chemical properties represent particular problems which have hitherto stood in the way of implementation. In general, the extruder is made of steel. This material would be badly damaged by corrosion and abrasion during processing of salts.

It has been found that corrosion can be greatly reduced in extruders whose essential components are made of nickel alloys. It has furthermore been found that the metal parts of the extruder which come into contact with the salts or their melts can be protected against corrosive and abrasive damage by surface coatings with materials known to the person skilled in the art, such as PTFE/PFA, enamel or ceramic materials. In order to reduce abrasion, an additional bearing can be installed at the head of the screw.

Surprisingly, it has been found that the installation of screw elements with a reversed flow direction allows a completely molten and homogeneous product to be obtained in spite of a very short average residence time of the material in the extruder of a few seconds.

The reaction in the extruder can be carried out in the presence of atmospheric oxygen or, if desired, under a protective-gas atmosphere (for example nitrogen, $CO_2$ or noble gases) at a reduced pressure, atmospheric pressure or even at superatmospheric pressure at temperatures of from 50° C. to 800° C. (at atmospheric pressure). When working under superatmospheric pressure or reduced pressure, the melting points of the salts shift correspondingly and the heating stages of the extruder are modified correspondingly.

Processing should be carried out below the sublimation temperature of the starting materials. The reaction is preferably carried out at elevated temperatures, since the solubility of the salts is significantly better under such conditions.

During processing of the salts in the extruder, a specific choice of temperature in the heating stages allows an optimum temperature programme to be set during the process.

In order to carry out the process, the aluminium halide employed is a fluoride, chloride, bromide or iodide, or mixtures thereof. Suitable alkali metal salts are lithium, sodium, potassium, rubidium or caesium fluoride, chloride, bromide or iodide, or mixtures thereof.

A general example of the invention is explained in greater detail below and is shown in the drawing. FIG. 1 shows a heatable extruder 1 with a solids metering device 2 and downstream column or tower 3.

In order to prepare salts conforming to the formula (I), and mixtures .thereof, the starting materials can be fed to the extruder separately via solids metering devices 2. The starting materials can also be fed in, premixed in the same ratio, via a single metering device. The extruder can also be filled under an inert gas. An extruder with forced conveying pushes the salt bed forwards in the screw channel with screw speeds of between 1 rpm and 75 rpm. The screw geometry can have an 1/d ratio of between 3 and 25. In the heating zones of the jacket 1, the melting temperatures for various starting materials and end products can be set. In the final quarter, it is possible to use screw elements which cause back-mixing. This increases the residence time in this zone, and as yet unmelted salts are mixed with liquid melt.

The low-viscosity melt produced by the process is fed to a column or tower 3 containing the corresponding alkali metal salt. The melt is passed through the alkali metal salt in order to react residual amounts of unreacted metal halide.

The conveying pressure built up by the extruder can be utilized for the transport of the melt to and through the tower or column.

The example given below is given in order to better illustrate the present invention, but is not suitable for restricting the invention to the features disclosed therein.

EXAMPLES

Example 1

Preparation of $NaAlCl_4$

In order to prepare 1 kg/h of $NaAlCl_4$, 373.8 g/h of NaCl is fed to an extruder via a solids metering device and 626.2 g/h of $AlCl_3$ is fed to the extruder via a further solids metering device. A twin-screw extruder screw with forced conveying pushes this salt bed forwards in the screw channel at a screw speed of 25 rpm. The various heating zones of the jacket can be Adapted so that the salt is brought to the melting temperature of the salt during the stretch from the feed opening to the discharge zone. In the preparation of $NaAlCl_4$, a temperature of 182° C. is set in the feed. The final quarter contains screw elements which have a reversed conveying direction, thus increasing the residence time of the mixture in this zone. Unmelted salts are mixed with liquid melt in order to facilitate better heat transfer.

The low-viscosity melt formed is fed via a pipeline to a tower containing a bed of sodium chloride granules. In the tower, residues of unreacted $AlCl_3$ are converted to $NaAlCl_4$. The conveying pressure of the extruder is sufficient to transport the melt to and through the tower without an additional-pump device.

What is claimed is:

1. A process for preparing a salt melt, or a mixture of several salt melts, said salt or salts being of formula (I)

$$MDHAL_4 \qquad (I)$$

in which

M is Li, Na, K, Rb or Cs,

D is Al, Ga, In or Tl, and

Hal is F, Cl, Br or I, comprising melting and reacting one or more metal (D) halides (Hal) and one or more alkali metal (M) salts in a heatable extruder with forced conveying, and then contacting the reaction product with an alkali metal M salt.

2. A process according to claim 1, wherein the metal halide and the alkali metal salt are melted and brought to reaction in a heatable extruder with forced conveying at a temperature of 50° C. to 800° C.

3. A process according to claim 1, wherein the reaction is carried out under reduced pressure, atmospheric pressure or superatmospheric pressure in the presence of atmospheric oxygen or, under a protective-gas atmosphere.

4. A process according to claim 1, wherein the parts of the extrude which come into contact with the salt or melt thereof are made of an Ni alloy or of a metal coated with PTFE/PFA, enamel or a ceramic material and which has a screw channel having an 1/d ratio of 3 to 25, at a screw speed of 1 rpm to 75 rpm.

5. An electrochemical cell or battery comprising a salt melt prepared according to claim 1.

6. A rechargeable sodium battery or a primary battery comprising a salt melt prepared according to claim 1.

7. A storage medium in a heat store comprising a salt melt prepared according to claim 1.

8. A heat-transfer agent comprising a salt melt prepared according to claim 1.

9. In a process for covering and purifying molten metals in a heating bath, the improvement comprising using a salt melt prepared according to claim 1.

10. In a process for electrocoating of high-melting materials, the improvement comprising using a salt melt prepared according to claim 1.

11. A process according to claim 1, wherein the metal halide and alkali metal salt are fed via a solids metering device to be melted and reacted.

12. A process according to claim 1, wherein the reaction products are contacted with an alkali metal salt in a tower or column.

13. A process according to claim 1, wherein the salt melt of formula (I) is $NaAlCl_4$.

14. A process according to claim 1, wherein the extruder is a single screw extruder, a multiscreen extruder with co-rotating and counter rotating screws, a vented extruder, a planetary-gear extruder, a ram extruder or disc extruder.

15. A process according to claim 1, wherein the extruder comprises one or more screw elements having reversed flow direction.

16. A process according to claim 1, wherein the metal halide is an aluminum halide.

17. A process according to claim 1, wherein the alkali metal salt is NaCl.

18. A process according to claim 11, wherein the alkali metal salt is NaCl.

19. A process according to claim 1, wherein the alkali metal salt that is melted and reacted in the extruder has the same chemical composition as the alkali metal salt that is contacted with the reaction product.

20. A method according to claim 17, wherein the extruder forces the reaction product through the tower or column.

* * * * *